Dec. 29, 1953   L. GRANSDEN   2,663,986
BEET TOPPING MECHANISM
Filed Aug. 13, 1951
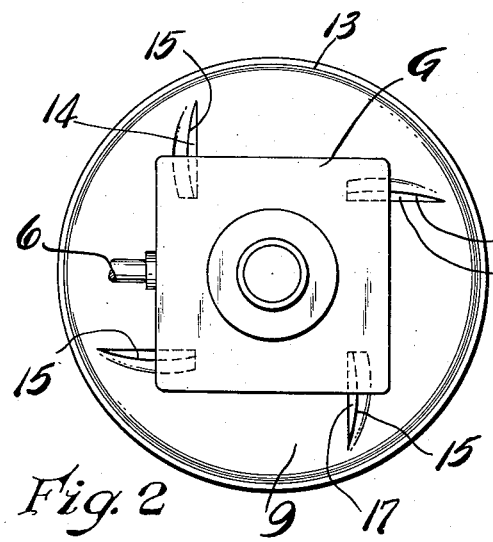
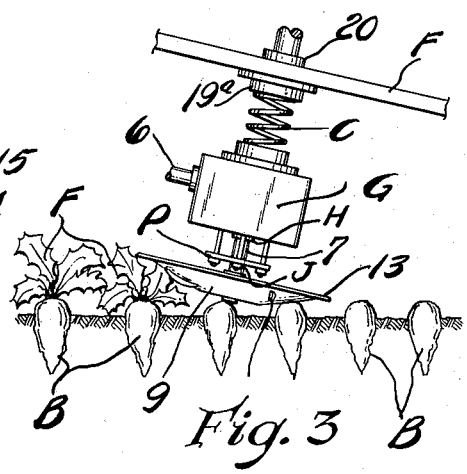
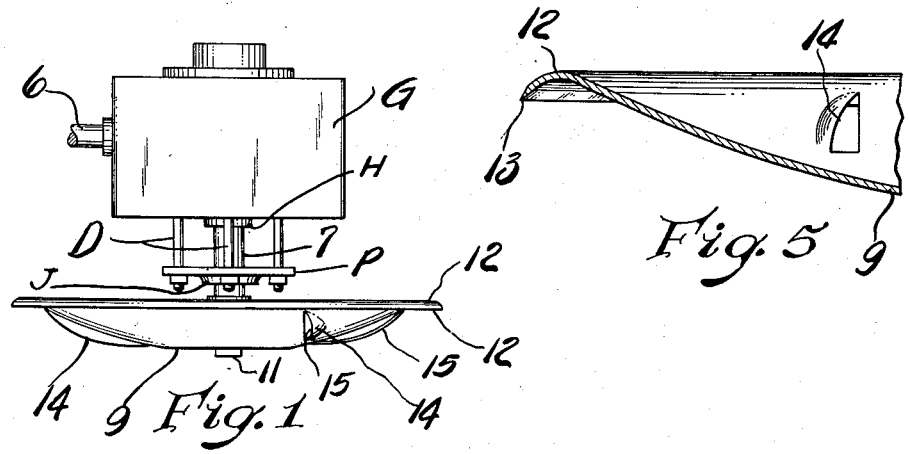
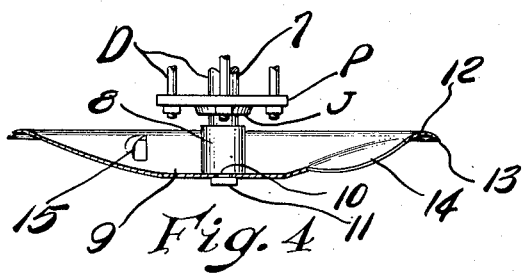
INVENTOR.
Lyle Gransden.
BY
Frank C. Karman.
ATTORNEY Patented Dec. 29, 1953

2,663,986

UNITED STATES PATENT OFFICE 2,663,986

BEET TOPPING MECHANISM

Lyle Gransden, Edenville, Mich.

Application August 13, 1951, Serial No. 241,523

6 Claims. (Cl. 56—121.4)

The present invention relates to a beet topping mechanism, and more particularly to a beet topping mechanism having a rotating topping and scarifying disk which is adapted to completely and uniformly remove the tops from sugar beets and similar produce.

One of the prime objects of the invention is to design a driven rotatable topping and scarifying disk which can be inexpensively manufactured, and will sever the tops or foliage from the beets during the harvesting thereof and prior to the lifting operation.

Another object of the invention is to provide a simple, practical and effective topping disk for simultaneously severing the leaves from the beets at the crown thereof and removes the outer skins on the upper protruding ends of the beets, thus forming a smooth, clean top.

A further object is to provide a beet topping disk of simple, but substantial construction that operates with equal facility on beets with very little foliage, or on which the foliage has withered and dried as well as on beets having a large green leaf structure, and which automatically throws the leaves free of the row of beets as the mechanism is operated.

Still a further object of the invention is to design a beet topping disk which is easily replaced on the beet harvesting mechanism when the cutting edges have become dulled through long usage, and when necessitated by long wear.

Another object is to provide a cutting disk for beet topping mechanisms such as harvesters and the like, which is formed of a dish-shaped disk having the peripheral rim curved reversely to provide a sharpened cutting edge and being provided with struck-up portions extending tangential with the cutter axis, and having the cutting edge of said struck-up portion extending in the direction of rotation of said disk such that said cutting edges will engage the beet tops and remove the crown portion so that the same will be in a clean condition when harvested by a conventional lifter.

Another object is to provide a beet topping disk for root plant harvesters and the like adapted to rotate about an axis tilted to the vertical such that the curved convex surface of the disk will be presented to the beet tops, so that the leading edges of the struck-up cutting ribs will cut the beet tops at a point slightly below the crown foliage point.

To the accomplishment of the foregoing and related ends, said invention then consists of the means hereinafter fully described, and particularly pointed out in the claims, the annexed drawing and following description setting forth in detail certain means and one mode of carrying out the invention, such disclosed means and mode illustrating, however, but one of the various ways in which the principle of the invention may be used.

In the drawing:

Figure 1 is a side elevational view showing my multiple cutting disk with the cutter blades struck from the convex portion thereof, and having their cutting edges extending in the direction of rotation. The cutting disk being shown connected to the output shaft of a gear housing.

Figure 2 is a top plan view showing the manner in which the struck out cutter elements are arranged tangentially.

Figure 3 is a reduced side elevational view illustrating the manner in which the topping disk is moved along a row of beets with the struck out cutter elements presented to the beet tops.

Figure 4 is a side elevational sectional view taken through the cutter member and showing the cutter elements stamped or punched in the body thereof to project beyond the convex surface of the dish-shaped disk to extend in the direction of disk rotation.

Figure 5 is an enlarged fragmentary sectional view of the topping disk, particularly illustrating its downwardly curled peripheral lip portion on which there is formed a cutting edge.

The cutting mechanism shown in the instant application is part of a complete beet harvesting mechanism for topping, lifting and gathering beets so that they may be deposited in piles or rows in the field.

In the accompanying drawing, there is shown a portion of the frame structure of a beet harvesting mechanism set forth as above including one of the frame bars F (Figure 3). Yieldingly supported from the frame bar F is a gear reduction box G which is suspended by means of a coil spring C. The gear reduction box G is provided with an input power shaft 6 which is adapted to be drivingly connected to the power take-off shaft of a tractor vehicle or the like with which the harvesting mechanism is connected in draft relationship. The gear reduction box G is provided with the usual gearing, and has formed in the lower face thereof a bearing boss H for an operating or power shaft 7. Formed in the lower end of the power shaft 7 is an enlarged portion 8 on which is securely anchored my basin-shaped cutting member or disk 9, and a central bore 10 may be provided in the disk 9 for receiving a threaded fastener or bolt 11 which is received in a correspondingly threaded opening (not shown) in the enlarged lower end portion 8 of the power output shaft 7. The threaded fastener 11 may have threads extending in an opposite direction to the direction of the rotation of the disk 9, such that any cutting forces tending to oppose the rotation of the disk 9 will turn the threaded fastener or bolt 11 in a direction to produce a self-tightening action and securely anchor the disk on the shaft 8.

A bearing plate P having a central bearing boss J for accommodating the shaft 7 is provided adjacent the lower end thereof, and bolts D are provided to form a stable, balanced structure, the disk 9 being driven from the shaft 7 and the shaft 7 is supported in the bearing bosses of the gear housing and plate P.

The cutting disk 9 is preferably fabricated of sheet metal and is substantially dished such as to provide a peripheral downwardly curling lip or rim portion 12, the outer edge of which is ground as best shown in Figure 3, and sharpened to form a knifelike cutting edge 13. Arcuate projections or cutters 14, the transverse cutting edges 15 of which are sharpened, are formed on the body of the disk 9 at spaced intervals in a stamping or punching operation. In the forming operation, a sliver of body material (not shown) is removed and the disk body adjacent the side of the slit 17 so formed is pressed or struck outwardly from the convex surface of the dish-shaped disk 9 to form the outwardly projecting cutters 14. The cutters 14 may be provided in any satisfactory number (there being four shown in Fig. 2), and are situated substantially vertically in the sloped body of the cutting disk 9 at right angles to one another, and extending tangentially with respect to the cutter spin axis so that a maximum cutting edge is available at the first point of contact with the beet as the device rotates during the topping operation.

The struck-up portions 14 project from the convex surface of the cutting disk 9 and are arranged with their projected cutting edges 15 extending in the direction of disk rotation. As shown in Figure 2, the body of the disk struck from the convex surface thereof is slightly bowed such that the cutting edge will be likewise bowed. This structure produces an action similar to the cutting action of a scythe in topping the beets and removing the foliage therefrom.

In practice, the beet harvesting mechanism is arranged to straddle the row of beets B so that the rotating cutting disk will be presented at an angle thereto (Fig. 3). The shaft 6 is drivingly connected to the power output shaft of the power plant of a tractor vehicle or of the harvester (not shown). The harvester with the mechanism attached is then driven along the row of beets B with the cutter axis tilted upwardly and rearwardly in relation to the direction of harvester travel. Rotation of the disk 9 which is driven by the output shaft 7 of the gearing unit G causes the cutting edge 13 on the lip 12 of said cutter disk to sever the bulk of the foliage F of the beets B, as well as the stems from the tops thereof as the cutter is advanced along the beet rows. The body cutters 14 on the convex surface of the disk 9 complete the removal of the stem and leaf structures, as well as chopping off the outer skins of the upper exposed ends of the beets, and as the cutting device leaves a beet of which the foliage has been severed, the rearmost portion of the rapidly rotating cutting edge 13 on the lip 12 scrapes over the upper ends or crowns of the exposed beets, and leaves the same with a smooth clean surface for being harvested by the lifting mechanism of the harvester.

In order to provide the necessary resiliency such that movement of the cutting disk may be effected when the same strikes a stone or the like in its pathway, a flexible suspension is preferably used and includes a relatively heavy coil spring C. In the instant application the coil spring C is shown on the upper end of the gear box G, and the spring C is seated therein, the upper end of the spring is similarly mounted in a cup 19a to which a threaded member 20 is connected, said threaded member extending through and having threaded engagement with the frame member F of the harvester, so that it can be adjusted as desired.

It will be obvious that the disk will not be adversely affected when the same is moved over uneven or stony ground, and that any desired portion of the top of the beet can be removed by changing the pressure, relative position, and design of the suspension structure.

From the foregoing description, it will be apparent that I have invented a very simple, practical and substantial beet topping disk which very materially increases the acreage of beets that can be harvested daily.

What I claim is:

1. In a beet topping mechanism, a power shaft, a basin-shaped cutting disk on said power shaft having a peripheral cutting edge, and a series of tangentially disposed cutting elements provided on the convex surface of said cutting disk to remove the foliage from the beets as the cutting disk is moved thereover, said cutting members projecting from the cutting disk and extending in the direction of rotation of said cutting disk.

2. In a beet topping mechanism, a power shaft tilted rearwardly and upwardly in a direction opposite to the direction of movement of said topping mechanism along a beet row, a dish-shaped cutting disk on the lower end of said power shaft having a peripheral downwardly turned lip portion providing a cutting edge for presentation to the beet crowns after the beets have been topped, and a series of circumferentially spaced tangentially disposed cutting elements projecting from the convex side of said cutter disk and having sharpened cutter edges extending in the direction of disk rotation, said cutter elements being portions of the convex body of the disk-shaped portion projecting outwardly from the main portion of the cutter disk.

3. A driven rotary dished beet topping disk for mounting on an operating shaft of a beet topping mechanism, formed with a knifelike rim, and a series of arcuate, tangentially disposed cutting elements projecting from the convex surface of said dished topping disk and extending in the direction of disk rotation, said elements being portions of the convex body of said dished topping disk projecting outwardly from the main portion thereof.

4. A driven rotary beet topping device comprising a basin-shaped beet topping disk mounted on a power shaft of a topping mechanism, said disk having a knife-like rim adapted to scrape the crowns of topped beets after the foliage has been removed, and a series of circumferentially spaced tangential arcuately projecting cutter elements formed on the body of said disk.

5. In a beet topping mechanism, a power shaft, a basin shaped cutting disk connected thereto and driven thereby, and a plurality of tangentially disposed cutting elements provided on the convex surface of said cutting disk to remove the foliage from the beets as the cutting disk is moved thereover, said cutting members projecting from the cutting disk and extending in the direction of rotation of said disk.

6. In a beet topping mechanism, a power shaft, a dish shaped cutting disk on the lower end thereof having a depending rim provided with a cutting edge for cutting foliage from the beets as the cutting disk is moved thereover, and a plurality of cutting elements provided on the convex surface of said disk and projecting therefrom to remove foliage and the crowns of the beets as the cutting disk is moved thereover.

LYLE GRANSDEN.

References Cited in the file of this patent

UNITED STATES PATENTS

| Number | Name | Date |
| --- | --- | --- |
| 2,250,651 | Pickens et al. | July 29, 1941 |
| 2,406,013 | Grew | Aug. 20, 1946 |